United States Patent
Bita et al.

(10) Patent No.: US 8,118,468 B2
(45) Date of Patent: Feb. 21, 2012

(54) ILLUMINATION APPARATUS AND METHODS

(75) Inventors: Ion Bita, San Jose, CA (US); Gang Xu, Cupertino, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 408 days.

(21) Appl. No.: 12/122,521

(22) Filed: May 16, 2008

(65) Prior Publication Data

US 2009/0284985 A1 Nov. 19, 2009

(51) Int. Cl.
*F21V 8/00* (2006.01)

(52) U.S. Cl. ........ 362/619; 362/603; 362/607; 362/616; 362/623; 362/610; 362/626

(58) Field of Classification Search .................. 362/619, 362/603, 607, 609, 610, 616, 623, 626, 651; 385/146, 901

See application file for complete search history.

(56) References Cited

U.S. PATENT DOCUMENTS

| | | | |
|---|---|---|---|
| 4,378,567 A | 3/1983 | Mir | |
| 4,918,577 A | 4/1990 | Furudate | |
| 5,226,099 A | 7/1993 | Mignardi et al. | |
| 5,283,674 A * | 2/1994 | Hanaoka et al. | 349/67 |
| 5,339,179 A | 8/1994 | Rudisill | |
| 5,452,385 A | 9/1995 | Izumi | |
| 5,481,385 A | 1/1996 | Zimmerman et al. | |
| 5,647,036 A | 7/1997 | Deacon | |
| 5,664,862 A | 9/1997 | Redmond et al. | |
| 5,764,315 A * | 6/1998 | Yokota et al. | 349/62 |
| 5,771,321 A | 6/1998 | Stern | |
| 5,845,035 A | 12/1998 | Wimberger-Friedl | |
| 5,892,598 A | 4/1999 | Asakawa et al. | |
| 6,040,937 A | 3/2000 | Miles | |
| 6,068,382 A | 5/2000 | Fukui et al. | |
| 6,074,069 A | 6/2000 | Chao-Ching | |
| 6,099,134 A | 8/2000 | Taniguchi | |
| 6,104,454 A | 8/2000 | Hiyama et al. | |
| 6,128,077 A | 10/2000 | Jovin | |
| 6,259,082 B1 | 7/2001 | Fujimoto et al. | |
| 6,283,602 B1 | 9/2001 | Kawaguchi et al. | |

(Continued)

FOREIGN PATENT DOCUMENTS

CN 1639596 A 7/2005

(Continued)

OTHER PUBLICATIONS

PCT International Search Report and Written Opinion dated Sep. 15, 2009 issued in PCT/US2009/043741, 15 pgs.

(Continued)

*Primary Examiner* — Sharon Payne

(74) *Attorney, Agent, or Firm* — Weaver Austin Villeneuve & Sampson LLP

(57) ABSTRACT

Disclosed are apparatus and methods for illuminating a display. In certain embodiments, the illumination apparatus includes a light guide that receives light from a light generator along an edge of the light guide and directs the received light via light extractor features (e.g., grooves) towards a display. The light guide includes at least two sets of light extractor features that are rotated with respect to each other so as to reduce a shadowing effect on the display when the display is viewed from within a specific range of viewing angles. In further embodiments, the spacing or orientation of each or one of the extractor feature sets may also be adjusted so that other visual artifacts, such as a Moiré effect, are reduced.

29 Claims, 13 Drawing Sheets

U.S. PATENT DOCUMENTS

| | | |
|---|---|---|
| 6,323,892 B1 | 11/2001 | Mihara |
| 6,407,785 B1 | 6/2002 | Yamazaki |
| 6,412,969 B1 | 7/2002 | Torihara |
| 6,454,452 B1 | 9/2002 | Sasagawa |
| 6,494,588 B1 | 12/2002 | Okada |
| 6,522,373 B1 | 2/2003 | Hira et al. |
| 6,522,794 B1 | 2/2003 | Bischel |
| 6,540,368 B2 | 4/2003 | Akaoka |
| 6,561,661 B2 | 5/2003 | Egawa |
| 6,565,225 B2 | 5/2003 | Mabuchi et al. |
| 6,582,095 B1 | 6/2003 | Toyoda |
| 6,592,234 B2 | 7/2003 | Epstein |
| 6,598,987 B1 | 7/2003 | Parikka |
| 6,603,520 B2 | 8/2003 | Umemoto |
| 6,631,998 B2 | 10/2003 | Egawa et al. |
| 6,636,358 B2 | 10/2003 | Umemoto et al. |
| 6,650,455 B2 | 11/2003 | Miles |
| 6,652,109 B2 | 11/2003 | Nakamura |
| 6,659,615 B2 | 12/2003 | Umemoto |
| 6,660,997 B2 | 12/2003 | Laberge |
| 6,669,350 B2 | 12/2003 | Yamashita |
| 6,674,562 B1 | 1/2004 | Miles |
| 6,706,339 B1 | 3/2004 | Miyatake et al. |
| 6,751,023 B2 | 6/2004 | Umemoto et al. |
| 6,761,461 B2 | 7/2004 | Mizutani et al. |
| 6,773,126 B1 | 8/2004 | Hatjasalo |
| 6,798,469 B2 | 9/2004 | Kimura |
| 6,819,380 B2 | 11/2004 | Wen et al. |
| 6,862,141 B2 | 3/2005 | Olczak |
| 6,865,312 B2 | 3/2005 | Niv et al. |
| 6,930,816 B2 | 8/2005 | Mochizuki |
| 6,960,010 B2 | 11/2005 | Matsumoto et al. |
| 6,961,045 B2 | 11/2005 | Tsao |
| 6,964,484 B2 | 11/2005 | Gupta |
| 7,001,060 B1 * | 2/2006 | Kimura .................. 362/620 |
| 7,056,001 B2 | 6/2006 | Chuang |
| 7,061,226 B2 | 6/2006 | Durr |
| 7,072,096 B2 | 7/2006 | Holman et al. |
| 7,110,158 B2 | 9/2006 | Miles |
| 7,123,216 B1 | 10/2006 | Miles |
| 7,128,459 B2 | 10/2006 | Igarashi et al. |
| 7,142,347 B2 | 11/2006 | Islam |
| 7,161,136 B1 | 1/2007 | Wenstrand |
| 7,163,315 B2 | 1/2007 | Chang et al. |
| 7,180,672 B2 | 2/2007 | Olczak |
| 7,206,133 B2 | 4/2007 | Cassarly |
| 7,212,345 B2 | 5/2007 | Wilson |
| 7,262,754 B1 | 8/2007 | Yamazaki |
| 7,278,772 B2 * | 10/2007 | Kunimochi ............ 362/619 |
| 7,290,917 B2 | 11/2007 | Cho et al. |
| 7,324,284 B2 | 1/2008 | Olczak |
| 7,360,899 B2 | 4/2008 | McGuire |
| 7,366,393 B2 | 4/2008 | Cassarly |
| 7,375,779 B2 | 5/2008 | Lee et al. |
| 7,400,439 B2 | 7/2008 | Holman |
| 7,520,642 B2 | 4/2009 | Holman et al. |
| 7,545,569 B2 | 6/2009 | Cassarly |
| 7,553,749 B2 | 6/2009 | Hu |
| 7,564,612 B2 | 7/2009 | Chui |
| 7,674,028 B2 | 3/2010 | Cassarly et al. |
| 7,706,050 B2 | 4/2010 | Sampsell |
| 7,750,886 B2 | 7/2010 | Sampsell |
| 7,758,227 B1 | 7/2010 | Coleman |
| 7,843,061 B2 | 11/2010 | Poli et al. |
| 7,876,489 B2 | 1/2011 | Gandhi et al. |
| 2001/0003504 A1 | 6/2001 | Ishihara |
| 2001/0019380 A1 | 9/2001 | Ishihara |
| 2001/0019479 A1 | 9/2001 | Nakabayashi |
| 2002/0006036 A1 | 1/2002 | Egawa |
| 2002/0034071 A1 | 3/2002 | Mabuchi |
| 2002/0080597 A1 | 6/2002 | Coghlan |
| 2002/0106182 A1 | 8/2002 | Kawashima |
| 2002/0135560 A1 | 9/2002 | Akaoka |
| 2002/0176035 A1 | 11/2002 | Yamazaki |
| 2003/0086031 A1 | 5/2003 | Taniguchi |
| 2003/0095401 A1 | 5/2003 | Hanson |
| 2003/0160919 A1 | 8/2003 | Suzuki |
| 2003/0169385 A1 | 9/2003 | Okuwaki |
| 2003/0193630 A1 | 10/2003 | Chiou |
| 2003/0210222 A1 | 11/2003 | Ogiwara et al. |
| 2003/0214728 A1 | 11/2003 | Olczak |
| 2003/0231483 A1 | 12/2003 | Higashiyama |
| 2004/0027315 A1 | 2/2004 | Senda et al. |
| 2004/0070711 A1 | 4/2004 | Wen et al. |
| 2004/0080938 A1 | 4/2004 | Holman |
| 2004/0085748 A1 | 5/2004 | Sugiura |
| 2004/0188599 A1 | 9/2004 | Viktorovitch et al. |
| 2005/0024849 A1 | 2/2005 | Parker |
| 2005/0041175 A1 | 2/2005 | Akiyama |
| 2005/0062410 A1 * | 3/2005 | Bell et al. .................. 313/506 |
| 2005/0088719 A1 | 4/2005 | Patel |
| 2005/0206802 A1 | 9/2005 | Creemers |
| 2005/0253980 A1 | 11/2005 | Saito et al. |
| 2005/0254771 A1 | 11/2005 | Yamashita |
| 2005/0259302 A9 | 11/2005 | Metz et al. |
| 2006/0002141 A1 | 1/2006 | Ouderkirk |
| 2006/0051048 A1 | 3/2006 | Gardiner |
| 2006/0062016 A1 | 3/2006 | Dejima |
| 2006/0066935 A1 | 3/2006 | Cummings |
| 2006/0132383 A1 | 6/2006 | Gally |
| 2006/0146575 A1 | 7/2006 | Saito et al. |
| 2006/0181866 A1 | 8/2006 | Jung |
| 2006/0209012 A1 | 9/2006 | Hagood |
| 2006/0209385 A1 | 9/2006 | Liu et al. |
| 2007/0064294 A1 | 3/2007 | Hoshino et al. |
| 2007/0081360 A1 | 4/2007 | Bailey |
| 2007/0086176 A1 | 4/2007 | Kanade et al. |
| 2007/0177405 A1 | 8/2007 | Chan et al. |
| 2007/0201234 A1 | 8/2007 | Ottermann |
| 2007/0268695 A1 | 11/2007 | Seetzen |
| 2008/0031011 A1 | 2/2008 | Hayashi et al. |
| 2008/0049445 A1 | 2/2008 | Harbers |
| 2008/0084600 A1 | 4/2008 | Bita et al. |
| 2009/0126777 A1 | 5/2009 | Khazeni et al. |
| 2009/0190373 A1 | 7/2009 | Bita et al. |
| 2009/0231877 A1 | 9/2009 | Mienko |
| 2009/0303746 A1 | 12/2009 | Wang |
| 2009/0320899 A1 | 12/2009 | Schiavoni |
| 2010/0156953 A1 | 6/2010 | Nevitt |
| 2010/0302135 A1 | 12/2010 | Larson et al. |
| 2011/0122479 A1 | 5/2011 | Sampsell |
| 2011/0157058 A1 | 6/2011 | Bita |

FOREIGN PATENT DOCUMENTS

| | | |
|---|---|---|
| CN | 1755494 A | 4/2006 |
| CN | 1795403 A | 6/2006 |
| CN | 101226259 | 7/2008 |
| DE | 199 42 513 | 3/2001 |
| EP | 0 590 511 | 4/1994 |
| EP | 0 984 314 | 3/2000 |
| EP | 1 079 264 | 2/2001 |
| EP | 1 143 270 | 10/2001 |
| EP | 1 251 454 | 10/2002 |
| EP | 1 271 223 | 1/2003 |
| EP | 1 296 094 | 3/2003 |
| EP | 1 336 876 | 8/2003 |
| EP | 1 389 775 | 2/2004 |
| EP | 1 437 610 | 7/2004 |
| EP | 1 519 218 | 3/2005 |
| EP | 1 531 302 | 5/2005 |
| EP | 1 832 806 | 9/2007 |
| EP | 1 870 635 | 12/2007 |
| EP | 1 640 764 | 4/2011 |
| GB | 2 315 356 | 1/1998 |
| GB | 2 351 834 | 1/2001 |
| JP | 09 171111 | 6/1997 |
| JP | 11 167808 | 6/1999 |
| JP | 11 211999 | 8/1999 |
| JP | 11 326898 | 11/1999 |
| JP | 2000 081848 | 3/2000 |
| JP | 2000 181367 | 6/2000 |
| JP | 2000 314882 | 11/2000 |
| JP | 2001-021883 | 1/2001 |
| JP | 2001-283622 | 10/2001 |
| JP | 2002 72284 | 3/2002 |
| JP | 2002-098838 | 4/2002 |
| JP | 2002-108227 | 4/2002 |

| | | |
|---|---|---|
| JP | 2002 174780 | 6/2002 |
| JP | 2002 365438 | 12/2002 |
| JP | 2003 173713 | 6/2003 |
| JP | 2003 188959 | 7/2003 |
| JP | 2003 344881 | 12/2003 |
| JP | 2006 099105 | 4/2006 |
| JP | 2009 0300966 | 12/2009 |
| TW | 567388 | 12/2003 |
| WO | WO 95/01584 | 1/1995 |
| WO | WO 98/19201 | 5/1998 |
| WO | WO 99/63394 | 12/1999 |
| WO | WO 99/67678 A2 | 12/1999 |
| WO | WO 00/50807 | 8/2000 |
| WO | WO 01/84229 | 11/2001 |
| WO | WO 03/007049 | 1/2003 |
| WO | WO 03/056876 | 7/2003 |
| WO | WO 2005/011012 | 2/2005 |
| WO | WO 2005/088367 | 9/2005 |
| WO | WO 2008/045218 | 4/2008 |
| WO | WO 2008/045224 | 4/2008 |

OTHER PUBLICATIONS

Fan et al. "Channel Drop Filters in Photonic Crystals", Optics Express, vol. 3, No. 1, pp. 4-11, 1998.
Giles et al. "Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.
Little et al. "Vertically Coupled Microring Rosonator Channel Dropping Filter", IEEE Photonics Technology Letters, vol. 11, No. 2, pp. 215-217, 1999.
Magel, "Integrated Optic Devices Using Micromachined Metal Membranes", SPIE vol. 2686, 0-8194-2060-3, pp. 54-63, 1996.
Mehregany et al., "MEMS applications in Optical Systems," IEEE/LEOS 1996 Summer Topical Meetings, pp. 75-76, Aug. 1996.
Neal T.D. et al. "Surface Plasmon enhanced emission from dye doped polymer layers," Optics Express Opt. Soc. America, USA, vol. 13, No. 14, pp. 5522-5527, Jul. 11, 2005.
Oliner, "Radiating Elements and Mutual Coupling," Microwave Scanning Antennas, vol. 2, pp. 131-157 and pp. 190-194, 1966.
Zhou et al. "Waveguide Panel Display Using Electromechanical Spatial Modulators" SID Digest, vol. XXIX, 1998.
International Preliminary Report on Patentability dated Nov. 25, 2010, issued in PCT/US2009/043741, 9 pgs.
Idé et al. "Dot pattern generation technique using molecular dynamics" J. Opt. Soc. Am. A/vol. 20, No. 2/Feb. 2003.

* cited by examiner

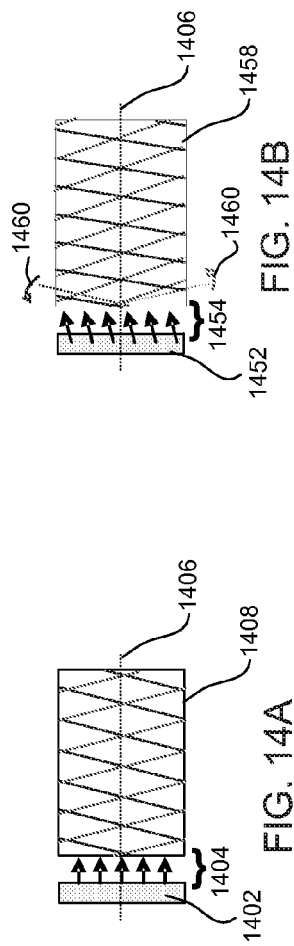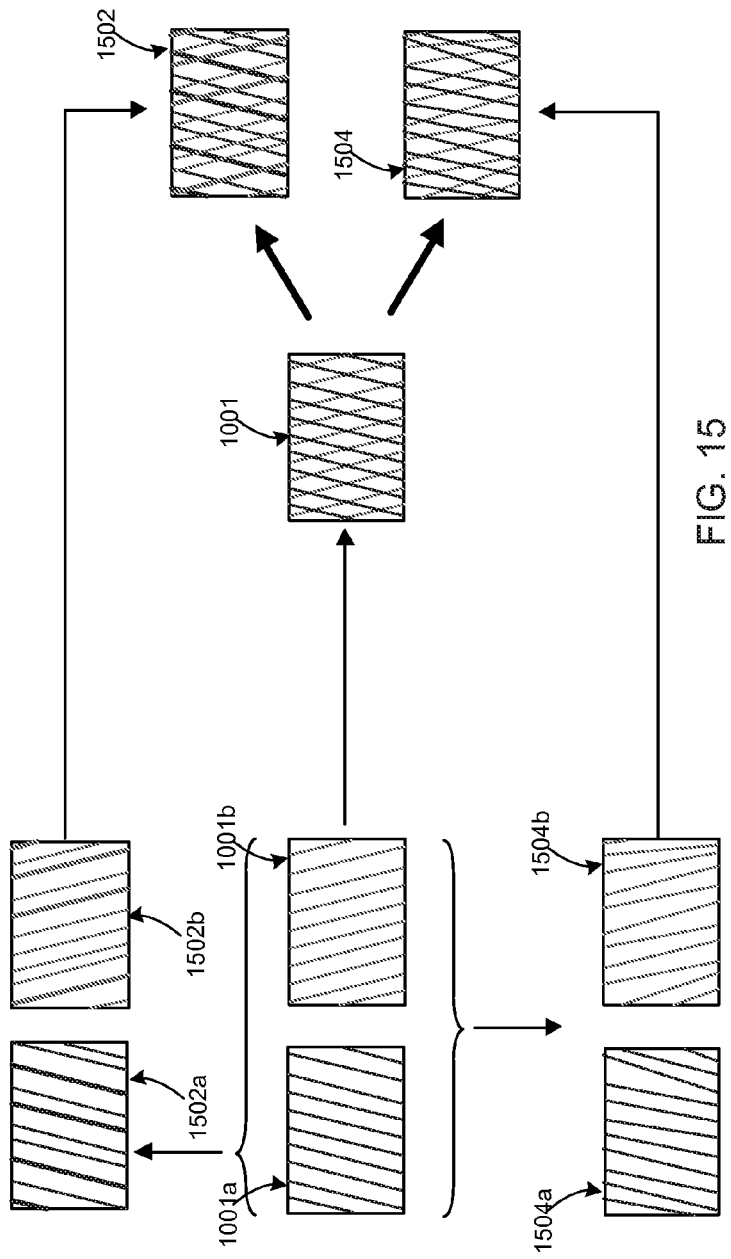

ILLUMINATION APPARATUS AND METHODS

BACKGROUND OF THE INVENTION

The present invention is related to display devices, such as Microelectromechanical systems (MEMS) and similar devices. It especially pertains to front lights (and back lights) for display devices.

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

Apparatus and methods for illuminating a display are provided. In certain embodiments, the illumination apparatus includes a light guide that receives light from a light generator along an edge of the light guide and directs the received light via light extractor features (e.g., grooves) towards a display. The light guide includes at least two sets of light extractor features that are rotated with respect to each other so as to reduce a shadowing effect on the display when the display is viewed from within a specific range of viewing angles. In further embodiments, the spacing or orientation of each or one of the extractor feature sets may also be adjusted so that other visual artifacts, such as a Moiré effect, are reduced.

In one embodiment, an apparatus for illuminating a display is disclosed. The apparatus includes a light source for providing a plurality of light beams and a light guide positioned to receive the light beams at a side surface of the light guide. The light guide further includes at least a first and second set of light extractor features that are arranged with respect to each other so as to direct at least some of the received light beams out a bottom surface of the light guide towards a display. The first and second set of light extractor features are rotated with respect to each other so that when the first set of light extractor features causes a shadow along a first region of the display as would be viewed from one of a predetermined range of viewing angles (e.g., ±30° or ±60° from a normal direction relative to the display surface), the second set of light extractor features illuminates such first region so as to substantially eliminate the shadow in such first region.

In a specific implementation, the first and second light extractor features each have a feature spacing that is selected so as to minimize a Moiré effect produced when viewing the display. In a further aspect, the first set and the second set of light extractor features each include a plurality of parallel grooves with varying spacing between adjacent pairs of grooves. In an additional or alternative implementation, the first and second light extractor features each have an orientation that is selected to minimize a Moiré effect produced when viewing the display. In a further aspect, the first set and the second set of light extractor features each include a plurality of parallel grooves with varying rotations, with respect to each other, that are selected to minimize a Moiré effect produced when viewing the display.

In one embodiment, the apparatus further includes a display and a processor that is configured to communicate with said display, said processor being configured to process image data. The apparatus further comprises a memory device that is configured to communicate with said processor. In a specific implementation, the first and second sets of light extractor features are arranged to provide a front light for the display. In another implementation, the first and second sets of light extractor features are arranged to provide a backlight light for the display. In specific implementations, the display is an interferometric modulator or a liquid crystal display.

In another aspect, the apparatus includes a driver circuit configured to send at least one signal to said display. In yet another embodiment, the apparatus also includes a controller configured to send at least a portion of said image data to said driver circuit. In another aspect, the apparatus includes an image source module configured to send said image data to said processor. In a further aspect, the image source module comprises at least one of a receiver, transceiver, and transmitter. In another implementation example, the apparatus includes an input device configured to receive input data and to communicate said input data to said processor.

In another embodiment, the apparatus includes a diffuser placed in front of the display to further spread light distribution from the light guide across the display. In another aspect, the one or more light sources are arranged to generate the light beams along a line. In a specific implementation, a feature depth of one or more features is varied within a same feature to compensate for a reduced illumination caused by the rotation of such feature. In another implementation, a feature depth varies across the first and/or second feature set. In yet another implementation, the first and second light extractor features each have an orientation that is further selected to compensate for off-center emission of the light beams from the light generator.

In an alternative embodiment, the invention pertains to a method of illuminating a display. A plurality of light beams are generated at a side surface of a light guide substrate(s) having at least a first and second set of light extractor features. At least some of the received light beams are directed out a bottom surface of the light guide substrate(s) towards a display so as to provide a predetermined range of viewing angles for the display. When the first set of light extractor features cause a shadow along a first region of the display at a particular one of the viewing angles, the second set of light extractor features illuminate such first region so as to substantially eliminate the shadow in such first region.

These and other features of the present invention will be presented in more detail in the following specification of the invention and the accompanying figures which illustrate by way of example the principles of the invention.

BRIEF DESCRIPTION OF THE DRAWINGS

FIG. 14A shows a top view of a front light having an edge light with centered emission of its incident beams.

FIG. 14B is a diagrammatic representation of a front light having an edge light with an off-normal emission lobe and a compensating light guide in accordance with a specific implementation of the present invention.

FIG. 15 illustrates various mechanisms for mitigating a Moiré effect in accordance with further embodiments of the present invention.

DETAILED DESCRIPTION OF THE SPECIFIC EMBODIMENTS

Figure 1:
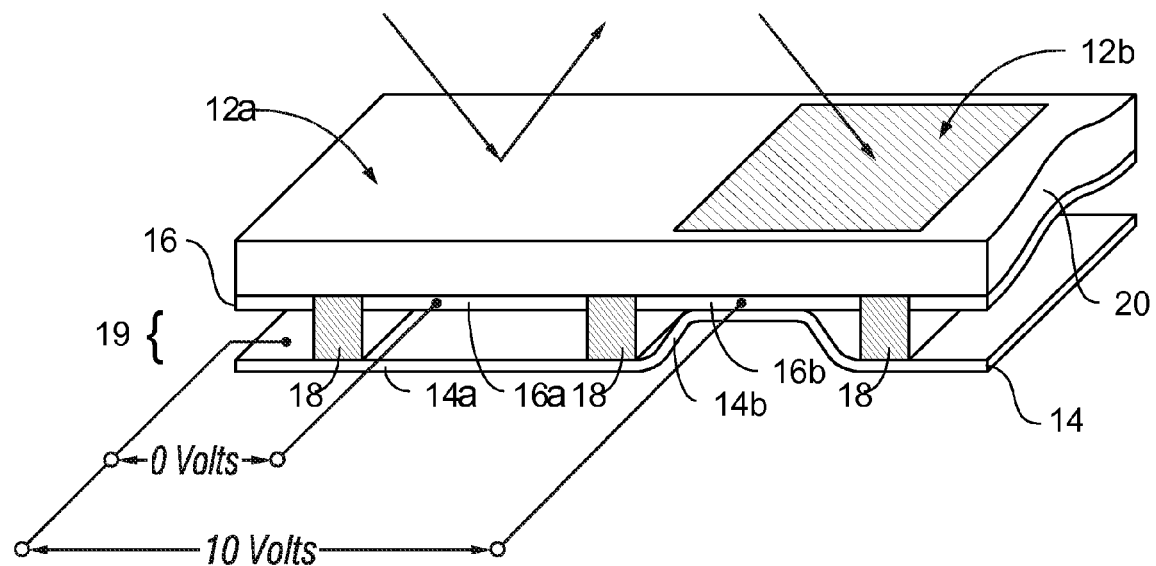
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The following detailed description is directed to certain specific embodiments. However, the teachings herein can be applied in a multitude of different ways. In this description, reference is made to the drawings wherein like parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

In general, certain embodiments of the present invention provide a front light (or a backlight) that is configured to provide substantially uniform illumination while substantially reducing one or more visual artifacts in a display device. The front light (or backlight) of certain embodiments includes a light guide that receives light from a light generator (e.g., injected along an edge of the light guide), guides the light along the light guide, and redirects and emits the light towards the display device to thereby provide substantially uniform illumination. The light guide includes extractor features (e.g., facets) located on a rear or front surface of the light guide slab that are configured to disrupt the propagation of light within the light guide towards a front (or back) surface of the display device. The light guide may include at least two sets of periodic extractor features that are rotated with respect to each other so as to eliminate or reduce a shadowing effect on the display when the display is viewed from within a specific range of viewing angles.

In further embodiments, the spacing or angles between the extractor features of one or more sets may also be adjusted so that the adjusted extractor features set are no longer uniformly periodic. This "randomization" of a feature extractor set may result in a substantial reduction of other visual artifacts, such as Moiré effects.

Although embodiments of a front light are mainly described herein as being implemented in an interferometric modulator display application, these embodiments can easily be implemented as other types of lights and in other types of displays, e.g., as a back light in an LCD (liquid crystal display) device. One interferometric modulator display embodiment comprising an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be on the order of <1000 Angstroms.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5 illustrate one exemplary process and system for using an array of interferometric modulators in a display application.

Figure 2:
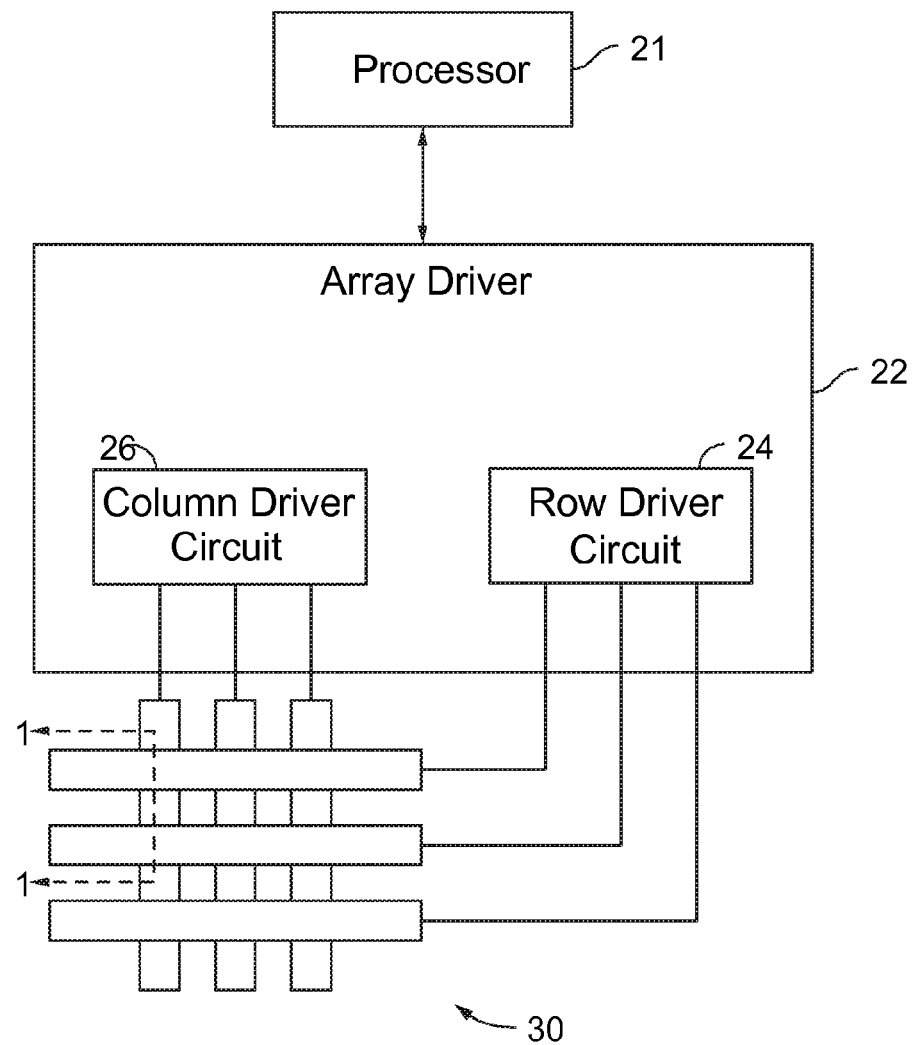
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
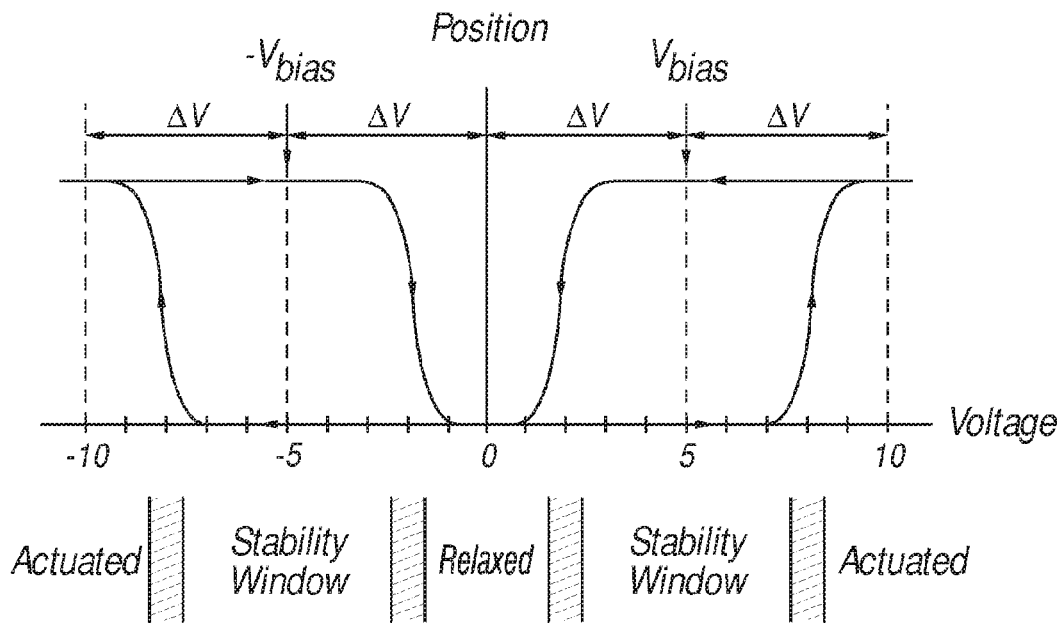
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
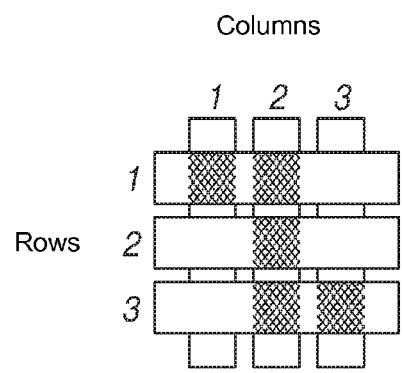
FIGS. 5A and 5B illustrate one exemplary timing diagram for row and column signals that may be used to write a frame of display data to the 3×3 interferometric modulator display of FIG. 2.
Figure 5B:
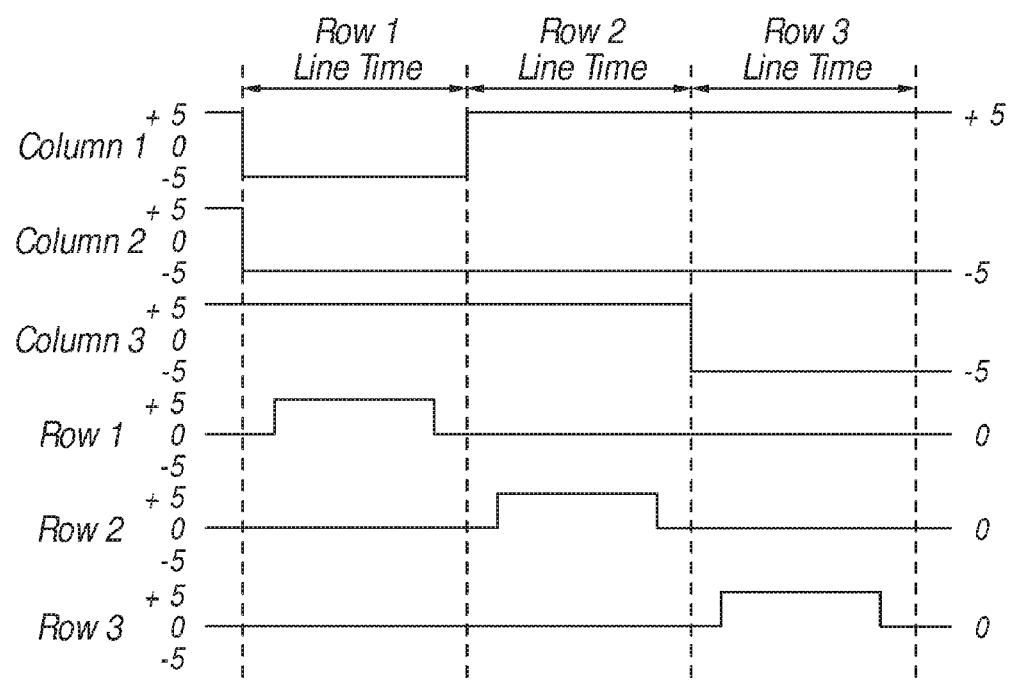

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
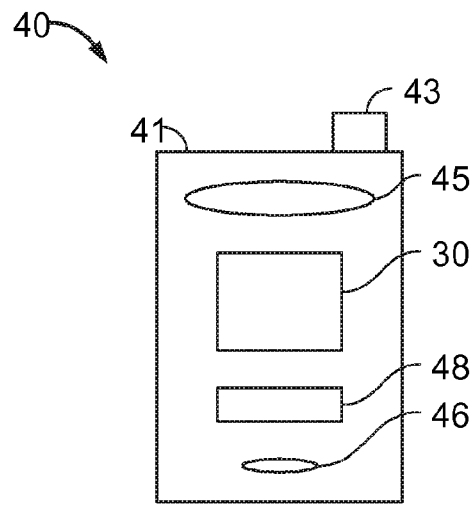
FIGS. 6A and 6B are system block diagrams illustrating an embodiment of a visual display device comprising a plurality of interferometric modulators.
Figure 6B:
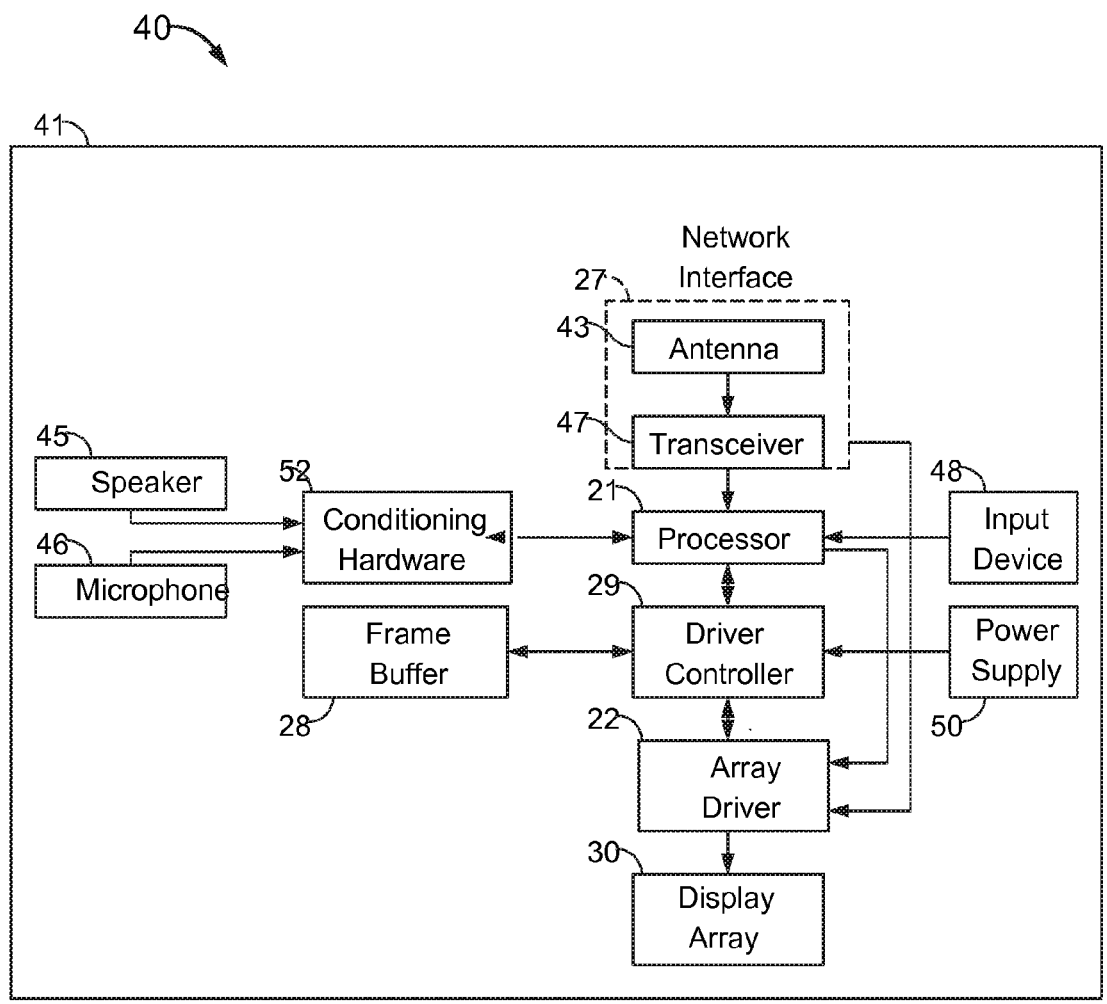

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device. However, in this illustrated example the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 that is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
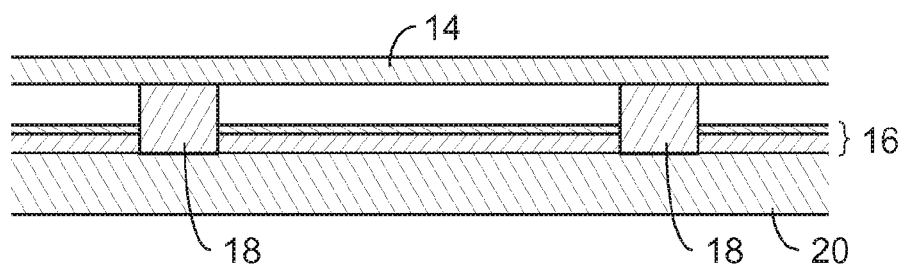
FIG. 7A is a cross section of the device of FIG. 1.
Figure 7B:
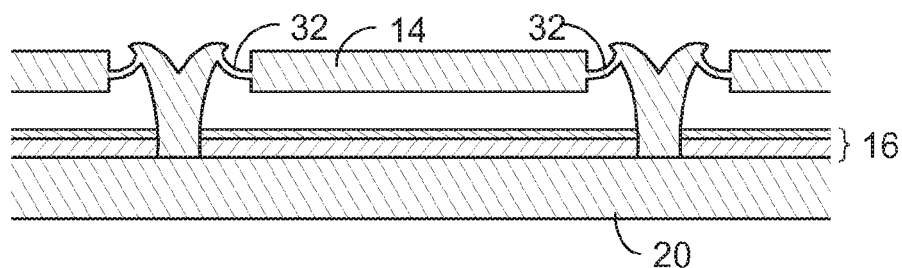
FIG. 7B is a cross section of an alternative embodiment of an interferometric modulator.
Figure 7C:
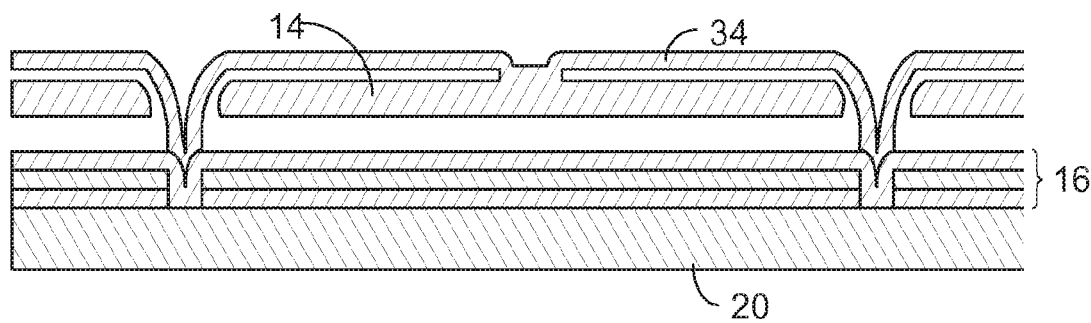
FIG. 7C is a cross section of another alternative embodiment of an interferometric modulator.
Figure 7D:
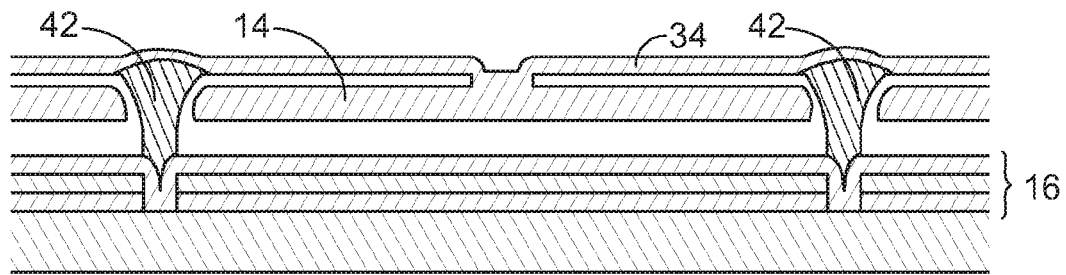
FIG. 7D is a cross section of yet another alternative embodiment of an interferometric modulator.
Figure 7E:
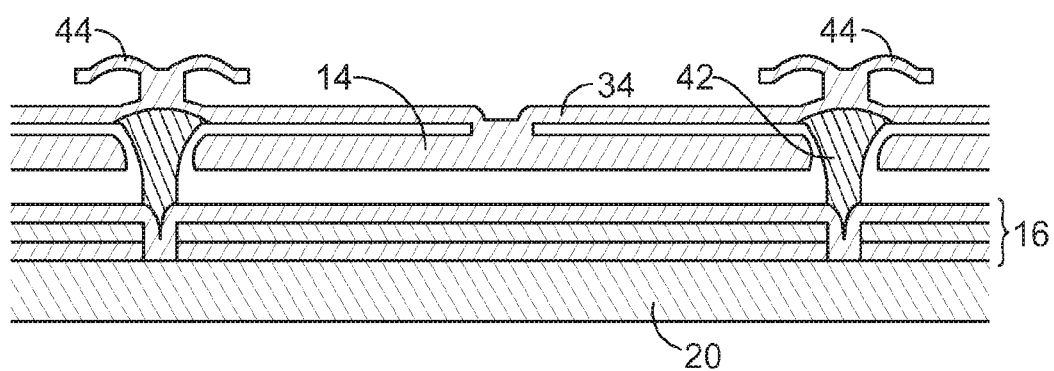
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators operate as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Since interferometric modulator displays reflect the ambient light, these types of reflective displays work well under bright ambient lighting conditions. Accordingly, a light source can be utilized with an interferometric modulator display to provide adequate viewing under low light conditions. In certain embodiments, the interferometric modulator display includes a front light or back light to serve as an additional light source under low light conditions. However, this front light (or back light) as described below may also be implemented with other types of displays, such as LCD displays.

Figure 8A:
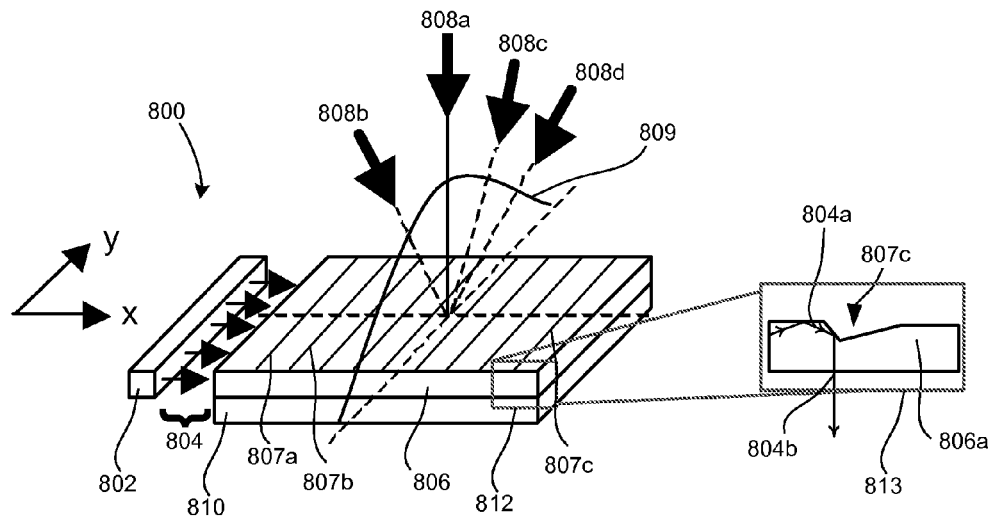
FIG. 8A is a perspective view of a display device that includes a front light.

FIG. 8A is a perspective view of a display device 800 that includes a front light. As shown, the display device 800 includes a display panel 810 for generating an image, a linear light source 802 for generating a plurality of incident light beams 804, and a light guide 806 that is positioned to receive the incident light beams 804 and direct them towards the panel display 810.

A typical light guide is shown in FIG. 8A and will be used to describe visual artifacts that may result when using a light guide to provide edge illumination to a front or back surface of a display panel. As shown, incident beams 804 are provided along an edge of the light guide 806. As the incident light is reflected throughout the light guide material 806, some of the light encounters light extractor features, e.g., 807a-807c, for directing incident light towards the display panel 810. In this example, the extractor features 807 comprise a set of parallel grooves that are perpendicular to the edge of the panel display 810 through which the incident light initially enters. A magnified side view 813 of light extractor feature 807c from area 812 is shown. By way of illustration in magnified view 813, incident light 804a strikes extractor feature 807c and is reflected as reflected light 804b towards the display panel 810. Each of the other extractor features also reflects the incident light towards the display panel 810.

Although the illustrated type of light extractor features work well for narrow viewing angles, this type of light guide design may result in visual artifacts under certain conditions. For instance, a shadowing effect may occur for particular viewing angles 808 of a plane that is perpendicular to the light input direction into the display panel 810. This shadowing effect is generally caused by the angular variation of the spatial distribution of the emitted light across the display area, as shown by various viewing angles distributed on a path 809. For example, when a linear edge light source is used (e.g., a light bar or a CCFL tube), a non-uniformity may appear as a darker or shadowed, corner region, which increases in area as the viewing direction moves further away from the display normal.

FIGS. 8B through 8E are top view representations of illumination of the display panel 810 as viewed through the light guide from viewing angles 808a, 808b, 808c, and 808d, respectively, of FIG. 8A. As shown in FIG. 8A, viewing angle 808a is normal to the surface of the panel 810, viewing angle 808b is tilted a first amount away from the normal, viewing angle 808c is tilted a direction that is opposite the viewing angle 808b, and viewing angle 808d is tilted by a second amount away form the normal that is greater than the tilt amount for angles 808b and 808c.

Figures 8B, 8C:
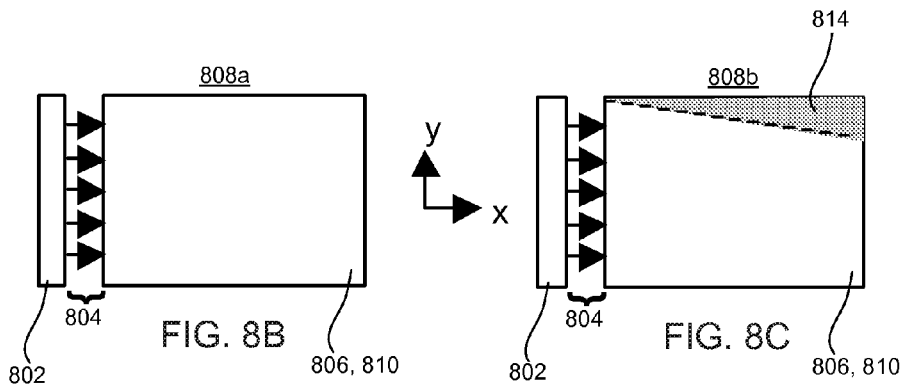
FIGS. 8B through 8E are top view representations of the display panel as viewed through the light guide from the different viewing angles of FIG. 8A.
Figures 8D, 8E:
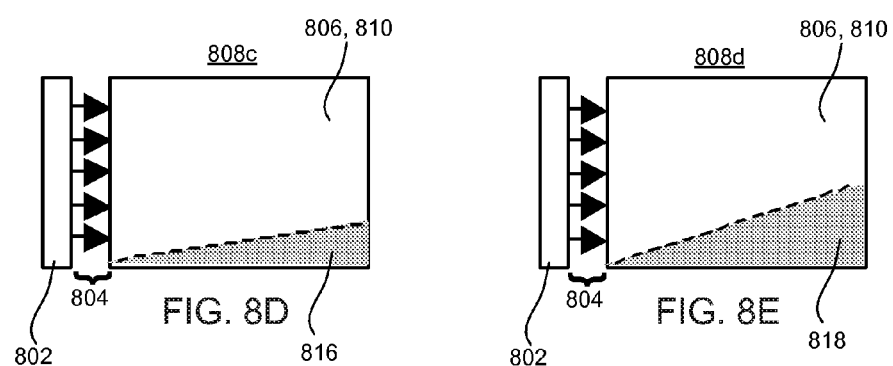

The normal angle 808a results in a uniformly illuminated appearance of the display 810 as shown in FIG. 8B. However, the other angles 808b through 808d result in a shadowing of particular display portions. The shadowed portions appear darker than the non-shadowed portions of the display 810. The shadowed portions tend to have a three dimensional appearance (not shown). As shown in FIG. 8C, when the viewing direction is tilted away from the display normal, a shadowed corner 814 comes into view. The boundary of this shadowed corner portion 814 is shown as a dashed line. The boundary of this shadowed corner portion 814 appears to be oblique in a plane that is perpendicular to the x,y plane and is further away from such x,y plane since this corner portion is further away from the light input source. FIG. 8D illustrates viewing angle 808c which results in a similarly sized shadowed corner 816, but in an opposite corner than the shadowed corner 814 of FIG. 8C. FIG. 8E represents a larger shadowed corner 818 when the viewing direction 808d is further away from the normal, e.g., than the angles 808b and 808c.

As the viewing angle moves further away from the normal, the shadowed portion can increase substantially, e.g., to cover more than 30% of the display area. In general, the distribution of light from the light guide to the panel display is non-uniform when the viewing angle changes in the plane perpendicular to the light input direction at the edge of the light guide. Embodiments of the present invention minimize this shadowing effect for a wide range of viewing angles.

In specific embodiments, the light guide includes at least a first and a second set of light extractor features, and the first set is rotated with respect to the second set so that shadowing is minimized for a specified range of viewing angles. When the first set of light extractor features causes a shadow along a first region of the display at a particular one of the viewing angles, the second set of light extractor features illuminates such first region so as to substantially eliminate the shadow in such first region that was caused by the first set of light extractor features.

Figure 9:
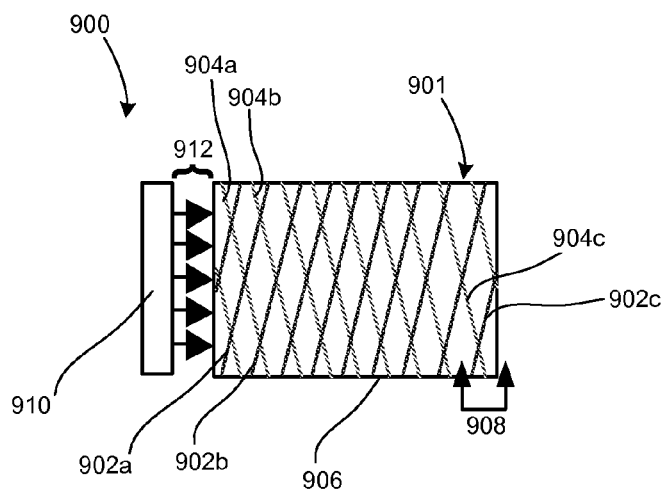
FIG. 9 is a top view diagrammatic representation of a light illumination system in accordance with one embodiment of the present invention.

FIG. 9 is a top view diagrammatic representation of a light illumination system 900 in accordance with one embodiment of the present invention. As shown, the illumination system 900 includes a light source generator 910 for providing a plurality of incident light beams 912 and a light guide 901 that is positioned to receive the incident light beams and direct at least some of the received incident light beams out a bottom surface of the light guide towards a display (not shown). This light guide has a first set of light extractor features 902 and a second set of extractor features 904, and the first and second set of extractor features overlap and are rotated with respect to each other. When the first set of light extractor features causes a shadow along a first region of the display as would be viewed from one of a predetermined range of viewing angles, the second set of light extractor features illuminates such first region so as to substantially eliminate the shadow in such first region as described further below.

The light generator or light source may take any suitable form for generating a plurality of incident light beams. By way of examples, the light generator may take the form of one or more individual light sources, such as a light bar, a Cold Cathode Fluorescent Lamp (CCFL) tube, one or more light emitting diodes (LEDs), fluorescent lamps, incandescent lamps, laser diodes, or any combination thereof. If a point source or a low number of light sources (e.g., a number too low to be arranged along the edge of the light guide so as to supply an adequate area of the display with illumination) are utilized, they may be split into a plurality of light sources as needed (e.g., by a beam splitter or a plurality of optical fibers) to be incident along the edge of the of the light guide. In a specific implementation, the incident beams are arranged in a linear fashion along the edge of the light guide although they may be distributed along the edge in any suitable pattern. The light generator may also provide incident light beams along more than one edge of the light guide.

The light guide may take any suitable form for providing at least two sets of light extractor features that are rotated with respect to each other to substantially eliminate or reduces shadowing at a predefined range of view angles. The light guide may be formed from a substantially transparent material, such as glass, plastic, polymer, etc. The light guide receives incident light into one or more of its edges and such incident light is internally reflected within the light guide. The light guide includes at least two sets of light extractor features on one or more surfaces that are parallel to the display panel surface. These light extractor features extract portions of the internally reflected light from the light guide and direct portions of the incident light towards the display panel.

Figure 10A:
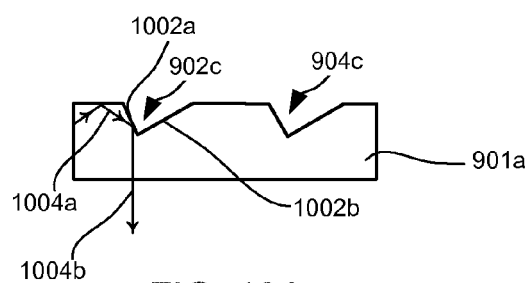
FIG. 10A is a side view representation of two facets from each of the sets of light extractor features of FIG. 9.

The light extractor features may take any suitable form for extracting light. In specific implementations, each set of extractor features comprises an array of parallel grooves or facets. Each groove may take any shape for extracting light towards the display panel. By way of examples, each groove may form a trench with a cross section shaped like a symmetrical "v", an unsymmetrical "v", overlapping grooves, etc. A flat area may be present between each pair of groove, e.g., as shown in FIG. 10A. Alternatively, the grooves may abut each other, e.g., forming a "vvvvvv" type structure.

Any suitable fabrication process may be used to form the light guide. In one implementation, a mold of the first and second set of features is formed in any suitable material, such as metal. For instance, the first and second set of features may be cut into the mold using a precision cutting tool, such as a diamond cutting tool. A fly-cutting technique, which allows cutting of arbitrary line patterns with high precision and with a wide choice of facet angles and configurations, may also be used. Once the mold is formed, a plurality of light guides having at least two feature sets can then be copied from the mold.

FIG. 10A is a side view representation of two facets from each set (e.g., 902*c* and 904*c*) as seen from side 906 along direction 908 of the light guide 901 of FIG. 9. As shown in side view, the light guide portion 901*a* includes groove 902*c* and 904*c*. Each groove may include a facet edge that is designed to extract light. In the illustrated embodiment, each groove includes a steep edge, e.g., 1002*a*, for extracting light and a shallower edge, e.g., 1002*b*, although each groove may include two steep edges that are both arranged to extract light. For example, incident light 1004*a* is reflected from the steep facet of groove 902*c* as reflected light 1004*b* towards the display panel (not shown). In a specific implementation, at least one facet has an angle between about 30° and 60° from the normal to the light guide substrate. While the steep facet (e.g., 1002*a*) may be between about 30° and 60°, the other shallower facet (e.g., 1002*b*) can have any angle between about 0° and 89.9° degrees as measured from normal.

Figure 10B:
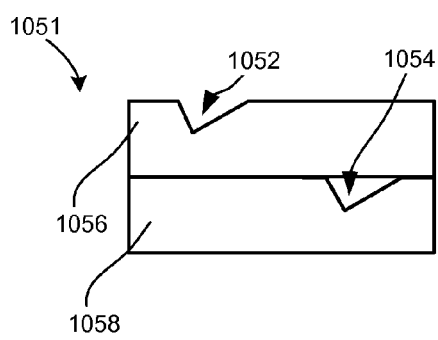
FIG. 10B is a side view representation of two facets from two different extractor feature sets in accordance with an alternative implementation of the present invention.

In the illustrated example of FIG. 10A, the facets of each extractor set are formed in a single substrate material. Alternatively, each set may be formed in a different substrate material. FIG. 10B is a side view representation of two facets from two different extractor feature sets in accordance with an alternative implementation of the present invention. As in FIG. 10A, only a portion 1051 of the light guide is shown. In this embodiment, a first set of facets, e.g., 1052, is formed in a first light guide substrate 1056, while a second set of facets, e.g., 1054, is formed in a second light guide substrate 1058. The first substrate is positioned over the second substrate. For example, after the first and second substrates are formed, the two substrates are coupled together, e.g., by any suitable binding material.

Figure 10C:
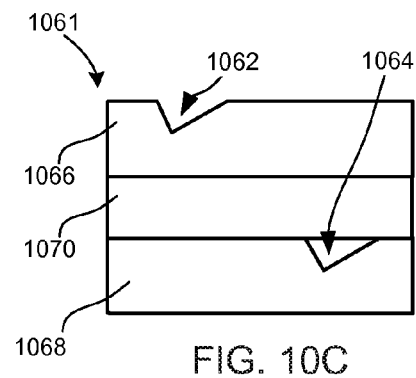
FIG. 10C is a side view representation of two facets from two different extractor feature sets in accordance with another implementation of the present invention.

FIG. 10C is a side view representation of two facets from two different extractor feature sets in accordance with an alternative implementation of the present invention. Similar to the light guide of FIG. 10B, the light guide portion 1061 of FIG. 10C includes a first set of facets, e.g., 1062, formed in a first substrate 1066, and a second set of facets, e.g., 1064, formed in a first substrate 1068. Although in this embodiment the first substrate is positioned over the second substrate, one or more other layers 1070 are formed between the two substrates. No matter how the layers of a light guide are arranged, the light guide layers (e.g., 901*a*, 1056, 1058, 1066, 1068, and 1070) are substantially transparent so as to direct incident light towards a display panel.

Figure 11:
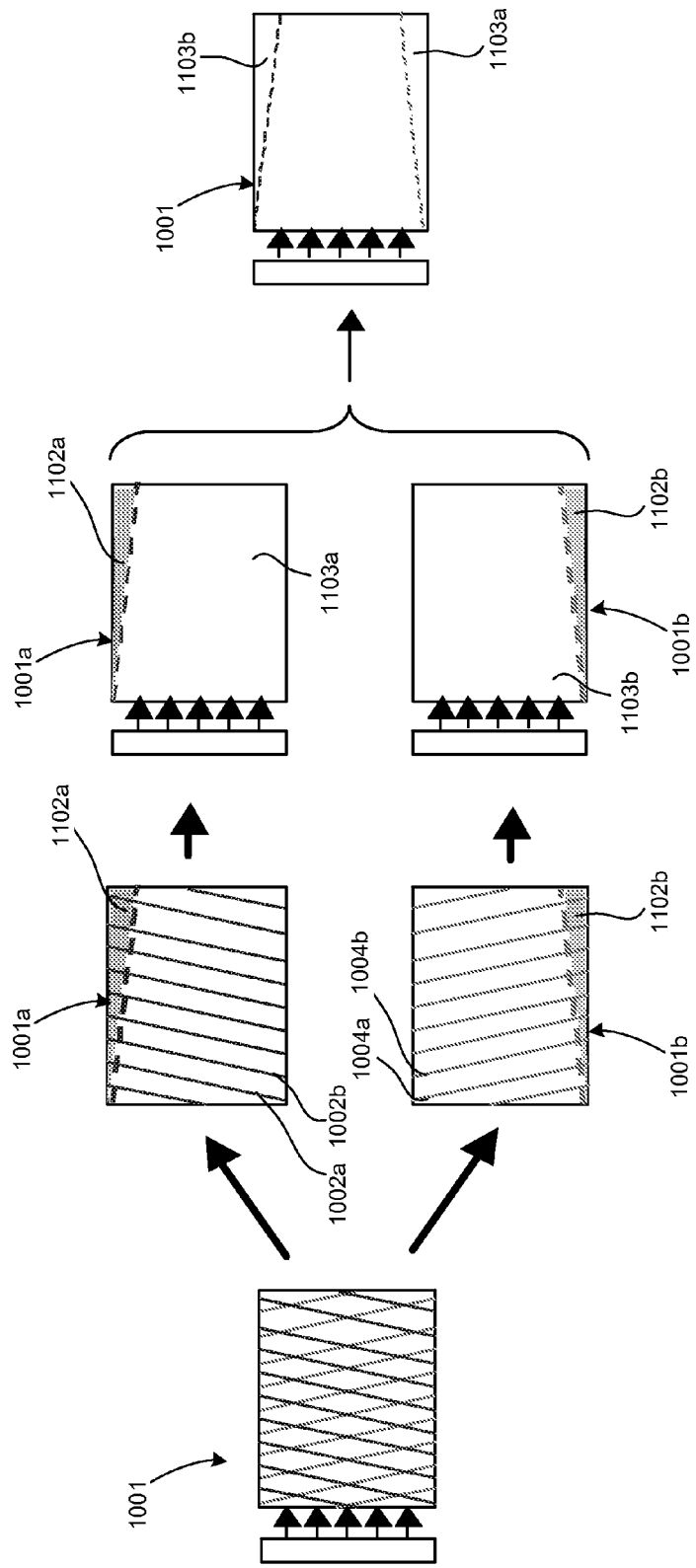
FIG. 11 is a diagrammatic representation of a light illumination system for substantially eliminating or reducing shadowing for a predefined range of viewing angles in accordance with a specific embodiment of the present invention.

FIG. 11 is a diagrammatic representation of a light illumination system 1001 for substantially eliminating or reducing shadowing for a predefined range of viewing angles in accordance with a specific embodiment of the present invention. In this example, the light guide is comprised of two overlapping sets of extractor features shown separately as 1001*a* and 1001*b*. The first set of features 1001*a* includes a set of grooves, e.g., 1002*a* and 1002*b*, while the second set of features 1001*b* include a set of grooves, e.g., 1004*a* and 1004*b*.

When light from the display panel that is transmitted through the light guide 1001 (and reflected from the display) is seen by a user at a specific viewing angle, light directed by the first set of features 1001*a* may show a shadow 1102*a* in a first corner area of the display while having substantial illumination 1103*a* in other areas the display. In contrast, light directed by the second set of features 1001*b* may show a shadow 1102*b* in a second corner of the display while having illuminated areas 1003*b* in the display. The illuminated portion of a particular feature set will cover substantially all of the display area, except for a single corner area, for viewing angles within a predefined range of angles from the normal. Since each set of extractor features is rotated in opposite directions in relation to the incident light, the first shadow corner 1102*a* will be opposite the second shadow corner 1102*b* and the first illuminated area 1103*a* will be opposite the second illuminated area 1103*b*.

When the lighting effects from both sets of features are combined together as seen through an overlapping set of features 1001 (as shown in the rightmost light guide representation), the shadow of each set of extractor features will tend to be cancelled out (or substantially reduced) by the illuminated portion of the other set of extractor features. That is, the illuminated portion 1103a substantially eliminates the shadow 1102b, while the illuminated portion 1103b substantially eliminates the shadow 1102a. Even when a shadow remains for each set of extractor features, the shadows are symmetrically present on two corners of the display and not as visually unappealing as an asymmetrical shadow.

Figure 12A:
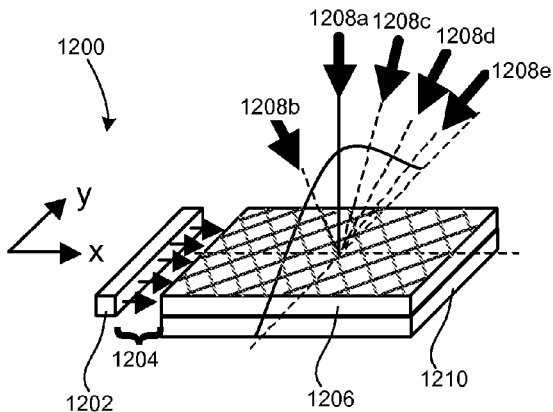
FIG. 12A is a perspective view of a display device that includes a front light in accordance with one embodiment of the present invention.

FIG. 12A is a perspective view of a display device 1200 that includes a front light in accordance with one embodiment of the present invention. As shown, the display device 1200 includes a display panel 1210 for generating an image, a line light source 1202 for generating a plurality of incident light beams 1204, and a light guide 1206 that is positioned to receive the incident light beams 1204 and direct them towards the panel display 1210.

In this embodiment, the light guide includes a first and second set of light feature extractors that are rotated with respect to each other so as to minimize shadowing for a predefined range of viewing angles, for example, as described in FIGS. 9, 10A~10C, or 11. FIGS. 12B through 12F illustrate the visual appearance of the display panel 1210 for a plurality of viewing angles 1208a~1208e (e.g., shown in FIG. 12A with respect to the display panel and light guide). In this illustrated example, the viewing angles are defined within a plane that is perpendicular to the direction of transmission of the incident beams 1204 as received into the light guide 1206.

Figure 12B:
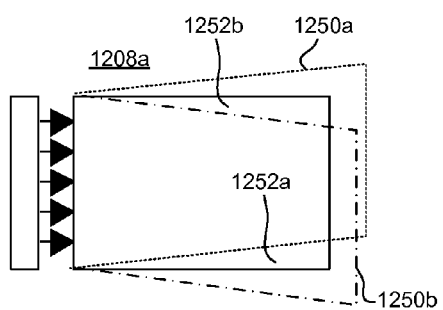
FIGS. 12B through 12F illustrate the visual appearance of the display panel of FIG. 12A for a plurality of viewing angles.

FIG. 12B illustrates viewing angle 1208a, which is normal to the surface of the display panel 1210 or perpendicular to the direction of the initial incident beams 1204 as received into the light guide 1206. As shown, a first illumination portion 1250a (dotted line) is achieved by the first set of extractor features and a second illumination portion 1250b (dash-dot-dash line pattern) is achieved by the second set of extractor features. Although the first illumination portion 1250a provides coverage for most of the display panel, an uncovered display portion 1252a is present. However, the second set of extractor features provides illumination 1250b for this uncovered first portion 1252a. Likewise, although the second illumination portion 1250b results in an uncovered display panel portion 1252b, the first set of extractor features provides illumination 1250a in this uncovered portion 1252b.

Figure 12C:
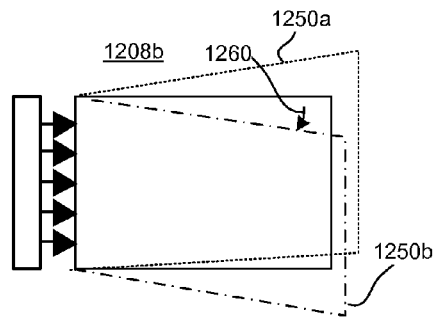
Figure 12D:
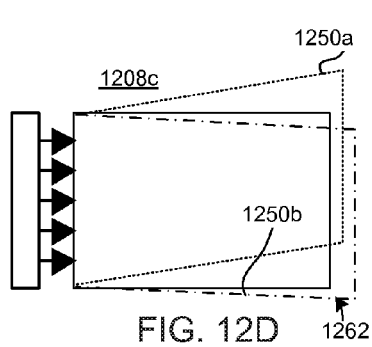
Figure 12E:
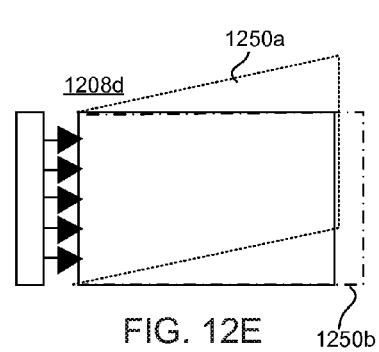
Figure 12F:
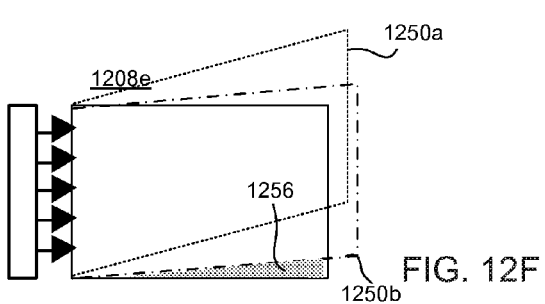

For a predefined set of viewing angles, each of the extractor feature sets will continue to provide illumination for the uncovered display portions of the other feature set as illustrated in FIGS. 12C through 12E. For instance, as the viewing angle tilts from the normal in a direction 1208b as shown in FIG. 12C, the first illumination portion both move with respect to the display panel in a first direction, e.g., direction 1260. In contrast, as the viewing angle tilts from the normal in an opposite direction such as viewing angle 1208c as shown in FIG. 6D, the first and second illumination portions both move with respect to the display in a second direction e.g., in a direction 1262, and this second direction is opposite the first direction. FIG. 12E illustrates further tilting of the viewing angle 1208d, which results in continued illumination of the display panel. However, as the viewing angle tilts beyond a predefined range of angles, a shadow may start to appear along one of the corners of the display, e.g., shadow 1256 as shown in FIG. 12F as seen from the 1208e viewing angle.

Embodiments of the present invention provide a light guide that can be utilized as either a front light or a back light of a display panel while substantially eliminating shadowing for a predefined range of viewing angles. The degree of rotation between two sets of light extractor features of such light guide can be determined or selected so as to substantially eliminate shadowing for a predefined range of viewing angles in any suitable manner. In one design implementation, the degree of rotation may be determined experimentally. For instance, two sets of extractor features formed in two different substrates can be rotated with respect to each other until the predefined range of viewing angles for a particular display no longer has shadowing.

In one embodiment, a first set of extractor features may be initially optimized to provide uniform illumination when used alone to direct incident beams towards a display, for example, when a set of periodic groove features are aligned perpendicular to the received incident beams. After the first set of features are optimized, the period of the first set of features is doubled and a second set of features is also formed with the doubled period. For instance, if a single set of extractor features having a 2 µm depth and a 100 µm period provide an optimized illumination, a light guide can be designed with two sets of features that each have a 2 µm depth and a 200 µm period. The period of the extractor features can be doubled since the light guide will have double the number of extractor features (i.e., in two sets of features). The first and second set of features can then be rotated with respect to each other to provide uniform illumination for the predefined range of angles, e.g., by experimentation. In a specific example, a relative rotation between the two sets of features of between about 5° and 30° works well for a range of viewing angles that are ±30° from the normal. This angle is between the two sets of grooves; for instance, 0° would result in the two sets being parallel to each other. In another example, the features sets may be rotated between about 5 and 60° so as to provide a uniform illumination without shadowing for a range of view angles that are ±60° from the normal.

Additional features may also be provided so as to further increase light uniformity. For instance, a diffuser may be placed in front of the display to spread the light distribution from the light guide across the display. In further example, the depth of some or all of the extractor features may be increased, as compared with using a single set of normal positioned features. In one embodiment, the groove depth for two sets of groove features is increased, as compared to the groove depth of a single set of groove features that are placed normal to the received incident beams. In other embodiments, the feature depth can be varied with the same feature to compensate for a reduced illumination caused by the rotation of such groove. Alternatively, the feature depth may be varied across the feature set. That is, different features may have different depths.

The rotation angle between the first and second set of extractor features can also be selected so as to substantially mitigate a Moiré effect. A Moiré effect may result when a periodically structured front light (or back light) illuminates a display with a periodic pixel structure. A Moiré effect typically manifests itself as an alternating sequence of visually brighter and darker regions of the image, even if the displayed image would be uniform at the pixel level, with no contrast variation, for example. The artificial contrast variability from the Moiré effect reduces image quality.

Figure 13A:
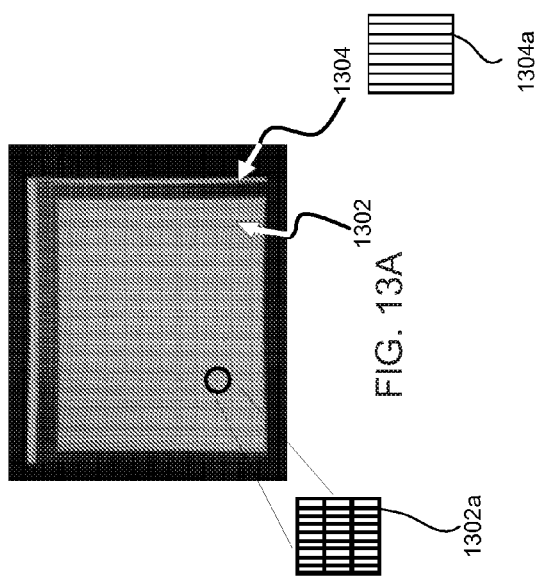
FIGS. 13A through 13E illustrate a process for mitigating a Moiré effect in accordance with one embodiment of the present invention.

FIGS. 13A through 13E illustrate a process for mitigating a Moiré effect in accordance with one embodiment of the present invention. FIG. 13A shows a top view of a first patterned mask 1302 containing structures that mimic a periodic array of display pixels. A magnified view 1302a of an area of this first mask 1302 is also shown. FIG. 13A also shows a second patterned mask 1304 that mimics a first set of light extractor features that are arranged into a set of parallel grooves. A magnified view 1304*a* of the extractor feature mask is also shown. Initially, the extracting features and display pixels may be rotated in a same orientation as shown in FIG. 13A. In this orientation, the Moiré effect is prominent.

Figure 13E:
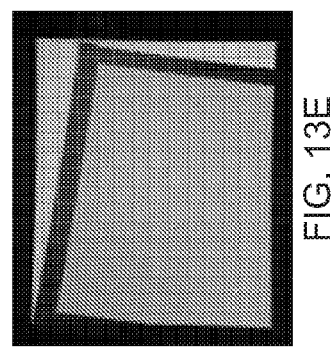
Figure 13D:
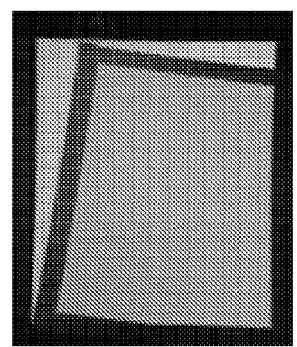
Figure 13C:
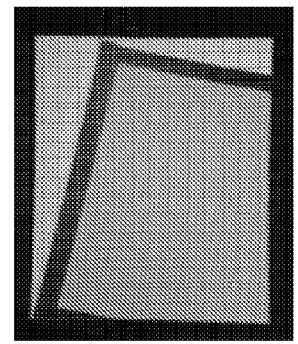
Figure 13B:
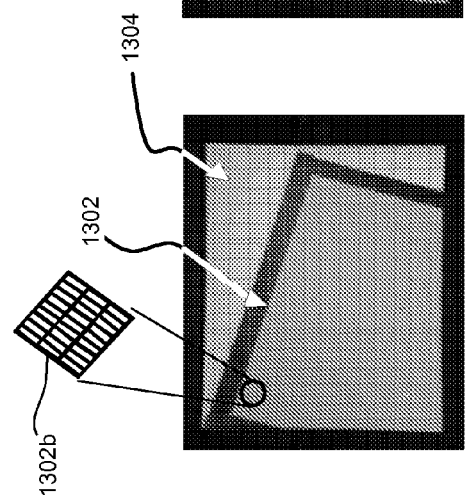

As the patterned masks are rotated with respect to each other, the Moiré effect decreases by varying amounts. FIGS. 13B, 13C, and 13D show different relative rotations between the two masks 1302 and 1304, which still result in substantial Moiré effect. However, FIG. 13E shows a relative rotation (e.g., 10°) which results in a minimum Moiré effect. This relative rotation may then be used as the rotation between each feature set of a light guide (e.g., +rotation for a first set and −rotation for the second set) and the underlying display.

The rotation of the feature sets may also be selected to compensate for an illumination source with an off-center emission peak. FIG. 14A shows a top view of a front light having an edge light 1402 (e.g., CCFL tube) with centered emission of its incident beams 1404 with respect to axis 1406, for example. The front light includes a light guide 1408 having a first and set of extractor features that are rotated with respect to each so as to minimize visual artifacts.

FIG. 14B is a diagrammatic representation of a front light having an edge light 1452 (e.g., light-bar) with an off-normal emission lobe and a compensating light guide in accordance with a specific implementation of the present invention. In this embodiment, the light guide includes a first and second set of extractor features which have been further rotated so as to compensate for the off-center emission of the edge light. As shown, the edge light 1452 outputs a plurality of incident beams 1454 in a direction that is rotated from the axis 1406 that is normal to the edge of the light guide 1458. In this embodiment, the light guide's extractor features are rotated in a direction 1460, as compared to the features of the light guide 1408 of FIG. 14B. This further rotation can compensate for the non-ideal off-center emission of the edge light 1452 and, accordingly, increase the amount of extracted light, while maintaining illumination uniformity.

A second mechanism for mitigating Moiré visual artifacts may be implemented by using a two dimensional randomization of the light guide features. FIG. 15 illustrates various mechanisms for mitigating a Moiré effect in accordance with further embodiments of the present invention. Two types of randomization may be employed together or individually to a light guide's extractor features. A first type includes randomizing the rotation or orientation of the features within each set, and a second type includes randomizing of the locations or spacing of the features within each set.

FIG. 15 shows a first set of extractor features 1001*a* and a second set of extractor features 1001*b* prior to a randomization process being implemented thereon. The first set of features and second set of features are shown together in light guide 1001. The positions of the individual extractor features of each set may be randomized in each set to produce a first set of randomized features 1502*a* and a second set of randomized features 1502*b*. These randomized features sets 1502*a* and 1502*b* are shown together in light guide 1502. Alternatively or additionally, the rotations of each set may be randomized to produce a first set of randomized features 1504*a* and a second set of randomized features 1504*b*, which are both shown together in light guide 1504.

Randomization of positions and/or rotations within each set may be implemented in any suitable manner. A randomization of rotation that is less than 10% of the original rotation amount may be utilized. In a specific implementation, each set of extractor features that have an initial rotation between about ±10° and ±20° are given an additional rotation that is less than about ±1° and ±2° for individual features. In a specific implementation. For a feature set with a period of about 200 μm, the features are given an additional position adjustment that is less than about 20 μm. Randomization of the feature positions may be combined together with randomization of rotation to provide a two dimensional randomized front or back light.

Embodiments of the present invention can provide a significant reduction of a variety of visual artifacts, such as Moiré, edge light-related shadows (aka "screen door" or "waterfall") visual artifacts. Additionally, high illumination uniformity may be achieved by compensating for an off-centered in-plane edge light angular distribution, as sometimes encountered for particular light sources. Established fabrication techniques can also be utilized to form the light guide embodiments of the present invention.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. An apparatus for illuminating a display, comprising:
a light source for providing a plurality of light beams; and
a light guide positioned to receive the light beams at a side surface of the light guide, wherein the light guide further includes at least a first and second set of light extractor features that are arranged with respect to each other so as to direct at least some of the received light beams out a bottom surface of the light guide towards a display, wherein the first and second set of light extractor features include substantially straight line segments that are rotated with respect to each other, the first set of light extractor features comprising a plurality of grooves having substantially randomized rotations with respect to other light extractor features in the first set.

2. The apparatus as recited in claim 1, wherein the first and second light extractor features each have a feature spacing that is selected so as to minimize a Moiré effect produced when viewing the display.

3. An apparatus as recited in claim 2, wherein the first set or the second set of light extractor features include a plurality of grooves with varying spacing between adjacent pairs of grooves.

4. The apparatus as recited in claim 1, wherein the first and second light extractor features each have an orientation that is selected to minimize a Moiré effect produced when viewing the display.

5. The apparatus as recited in claim 1, wherein the light guide includes a single transparent light guide substrate having the first and second set of light extractor features.

6. The apparatus as recited in claim 1, wherein the light guide includes a first transparent light guide substrate having the first set of light extractor features and a second transparent light guide substrate having the second set of light extractor features positioned over or beneath the first transparent light guide substrate.

7. The apparatus as recited in claim 6, wherein the first and second light guide substrates form part of a stack of transparent layers that include one or more other transparent light guide substrates.

8. The apparatus of claim 1, further comprising:
a display;

a processor that is configured to communicate with said display, said processor being configured to process image data; and a memory device that is configured to communicate with said processor.

9. The apparatus of claim 8, wherein the first and second sets of light extractor features are arranged to provide a front light for the display.

10. The apparatus of claim 8, wherein the first and second sets of light extractor features are arranged to provide a backlight light for the display.

11. The apparatus as recited in claim 8, further comprising:
a driver circuit configured to send at least one signal to said display.

12. The apparatus as recited in claim 11, further comprising:
a controller configured to send at least a portion of said image data to said driver circuit.

13. The apparatus as recited in claim 8, further comprising:
an image source module configured to send said image data to said processor.

14. The apparatus as recited in claim 13, wherein said image source module comprises at least one of a receiver, transceiver, and transmitter.

15. The apparatus as recited in claim 8, further comprising:
an input device configured to receive input data and to communicate said input data to said processor.

16. The apparatus of claim 8, wherein the display is an interferometric modulator.

17. The apparatus of claim 8, wherein the display is a liquid crystal display.

18. The apparatus of claim 8, further comprising a diffuser placed in front of the display to further spread light distribution from the light guide across the display.

19. The apparatus of claim 1, wherein the one or more light sources are arranged to generate the light beams along a line.

20. The apparatus of claim 1, wherein a feature depth of one or more features is varied within a same feature to compensate for a reduced illumination caused by the rotation of such feature.

21. The apparatus of claim 1, wherein a feature depth varies across the first and/or second feature set.

22. The apparatus as recited in claim 1, wherein the first and second light extractor features each have an orientation that is further selected to compensate for off-center emission of the light beams from the light generator.

23. The apparatus of claim 1, the second set of light extractor features comprising a plurality of grooves having varying rotations with respect to other light extractor features in the second set.

24. The apparatus of claim 1, the second set of light extractor features comprising a plurality of grooves having varying spacing with respect to other light extractor features in the second set.

25. An apparatus for illuminating a display, comprising:
means for generating a plurality of light beams; and
means for directing at least some of the light beams out a bottom surface of a light guide towards a display so as to provide a predetermined range of viewing angles for the display while substantially eliminating shadows within the predetermined range of viewing angles, wherein the directing means comprise a first set of light extractor features and a second set of light extractor features that intersect and are rotated with respect to each other, the first set of light extractor features comprising a plurality of grooves having substantially randomized rotations with respect to other light extractor features in the first set.

26. The apparatus of claim 25, the second set of light extractor features comprising a plurality of grooves having varying rotations with respect to other light extractor features in the second set.

27. The apparatus of claim 25, the second set of light extractor features comprising a plurality of grooves having varying spacing with respect to other light extractor features in the second set.

28. An apparatus for illuminating a display, comprising:
a light source for providing a plurality of light beams; and
a light guide positioned to receive the light beams at a side surface of the light guide, wherein the light guide further includes at least a first and second set of light extractor features that are arranged with respect to each other so as to direct at least some of the received light beams out a bottom surface of the light guide towards a display, wherein the first and second set of light extractor features include substantially straight line segments that intersect and are rotated with respect to each other, the first set of light extractor features comprising a plurality of grooves with substantially randomized spacing between adjacent grooves.

29. The apparatus of claim 28, the second set of light extractor features comprising a plurality of grooves having varying rotations with respect to other light extractor features in the second set.

* * * * *